Dec. 22, 1931. H. O. HEM 1,837,548
WEIGHING SCALE
Filed March 25, 1929
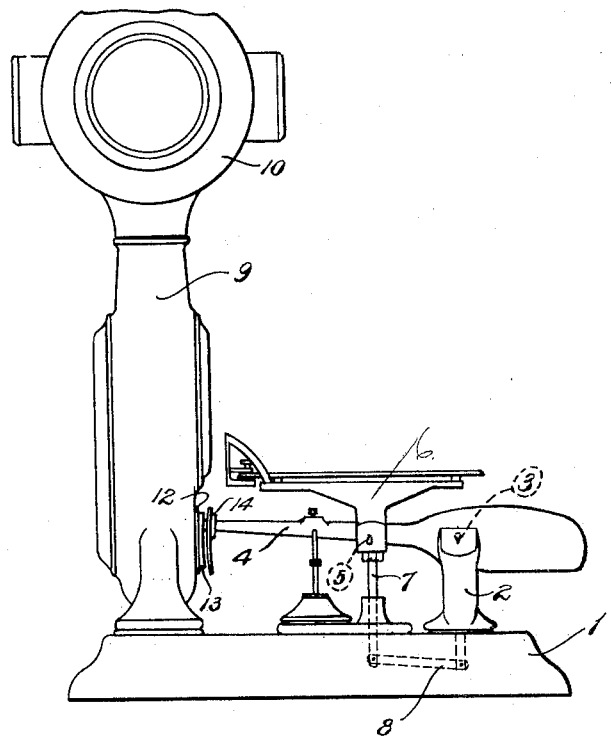
Fig. I
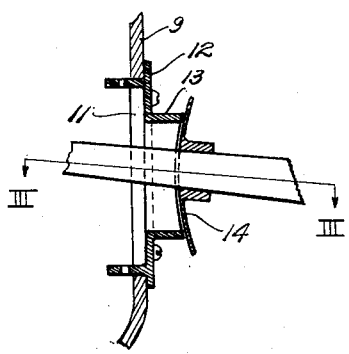
Fig. II
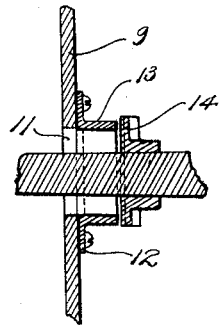
Fig. III
Inventor
Halvor O. Hem.
By C. O. Marshall,
Attorney Patented Dec. 22, 1931

1,837,548

UNITED STATES PATENT OFFICE

HALVOR O. HEM, OF TOLEDO, OHIO, ASSIGNOR TO TOLEDO SCALE MANUFACTURING COMPANY, OF TOLEDO, OHIO, A CORPORATION OF NEW JERSEY

WEIGHING SCALE

Application filed March 25, 1929. Serial No. 349,569.

This invention relates to improvements in weighing scales, and in particular to scales used in retail shops in tropical or sub-tropical countries where there are numerous insects which may enter the scale housing and interfere with the proper operation of the device.

One of the principal objects of this invention is the provision of means, for preventing the access of insects to the interior of the scale.

Another object is the provision of means accomplishing the above object in a manner which does not add friction in the operation of the scale.

A further object is the provision of means, whereby the above object may be attained in scales which were previously not so equipped.

Other objects will be apparent from the following description, in which reference is had to the accompanying drawings and wherein similar reference numerals designate similar parts throughout the several views.

Referring to the drawings in detail:

Figure I is a side elevational view of a scale embodying my invention.

Figure II is an enlarged fragmentary view, partly in section, of the device attached to lever of the scale; and Figure III is a sectional view taken substantially along the line III—III of Figure II.

In certain localities insects, such as flies, cockroaches, and other beetles cause considerable annoyance by entering the interior of scales and remaining there. Cockroaches and beetles are omniverous and they greedily attack the insulation of the electric light wires, and the paper on which the indicia are printed. They also become wedged between movable scale members and thus cause friction.

The scale per se, to which I have shown the device embodying my invention attached, is a well known scale which is fully illustrated and described in Patent No. 1,166,128 to Hapgood, and I will only describe it in so far as is necessary to properly explain my invention.

The base 1 supports near one of its ends a base horn 2, which contains suitable bearings on which rest the fulcrum pivots 3 of the scale lever 4. The lever 4 is also provided with laterally extending pivots 5 on which the commodity platter spider 6, is supported. The spider 4 has a depending stem 7, which extends into the hollow base 1 and is there pivotally connected to a check link 8 which constrains the platform to a condition of level. At the opposite end of the base an upwardly extending housing 9 is fixed which houses the counterbalancing mechanism and supports the casing 10 in which the indicating mechanism is located.

The lever 4 extends into an opening 11 in the housing 9. This opening is of sufficient size to clear the lever at the extreme of its stroke, vertically, and has also sufficient lateral clearance. As this is the opening through which the insects enter, I have attached a frame 12, which surrounds the opening and has an extending portion 13 which terminates in a concave contour, whose radius is the distance from the edge of the fulcrum pivot. A curved plate 14 through which the lever 4 projects and to which it is fastened is adapted to substantially cover this opening when the scale is in the unloaded or zero position. The radius of the curvature of the plate is substantially that of the projection portion 13 of the plate 12. This plate is adapted to be adjusted on the lever, to a position, within a small fraction of an inch from the projecting portion 13 of the plate 12. It is obvious, that, as the two arcuate members have the same center of curvature, this clearance will be maintained throughout the stroke of the lever and no friction will result. It will be readily seen that when the two members are properly adjusted, they form a simple, yet effective barrier to the entrance of insects. The members may be so designed, in sections, that they can be attached to scales, which are in use, without disturbing their adjustment and balance.

The embodiment of my invention herein shown and described is to be regarded as illustrative only, and it is understood that the invention is susceptible to variation, modification and change within the spirit and scope of the subjoined claims.

Having fully described my invention, I claim:

1. In a device of the class described, in combination, a base, a housing mounted thereon, a lever supporting a load receiver pivotally mounted on said base and extending horizontally through an opening to said housing, and frictionless means surrounding said lever for substantially closing said opening.

2. In a device of the class described, in combination, a base, a housing mounted thereon, a lever supporting a load receiver pivotally mounted on said base and extending horizontally through an opening into said housing, and frictionless means surrounding said lever for substantially closing said opening when said lever is in the unloaded position.

3. In a device of the class described, in combination, a base, a housing containing load counterbalancing mechanism, a load receiving mechanism including a lever mounted on said base, a portion of said lever extending through an opening into said housing and means surrounding said lever for substantially closing said opening when no load is on said load receiver.

4. In a device of the class described, in combination, a base, a housing containing load counterbalancing mechanism, load receiving mechanism including a lever mounted on said base, a portion of said lever extending through an opening into said housing and means for substantially closing said opening when no load is on said load receiver, said means comprising a stationary frame having an arcuate concave face, mounted on said housing, and an arcuate convex plate mounted on said lever, said arcuate surfaces having substantially the same center of curvature, and the arcuate surface of said plate being adapted to move closely adjacent to said arcuate frame surface.

HALVOR O. HEM.